T. STOBS AND W. LIGHTELL.
SIGNALING LAMP FOR MOTOR VEHICLES.
APPLICATION FILED MAR. 30, 1917.
1,350,682.
Patented Aug. 24, 1920.
2 SHEETS—SHEET 1.
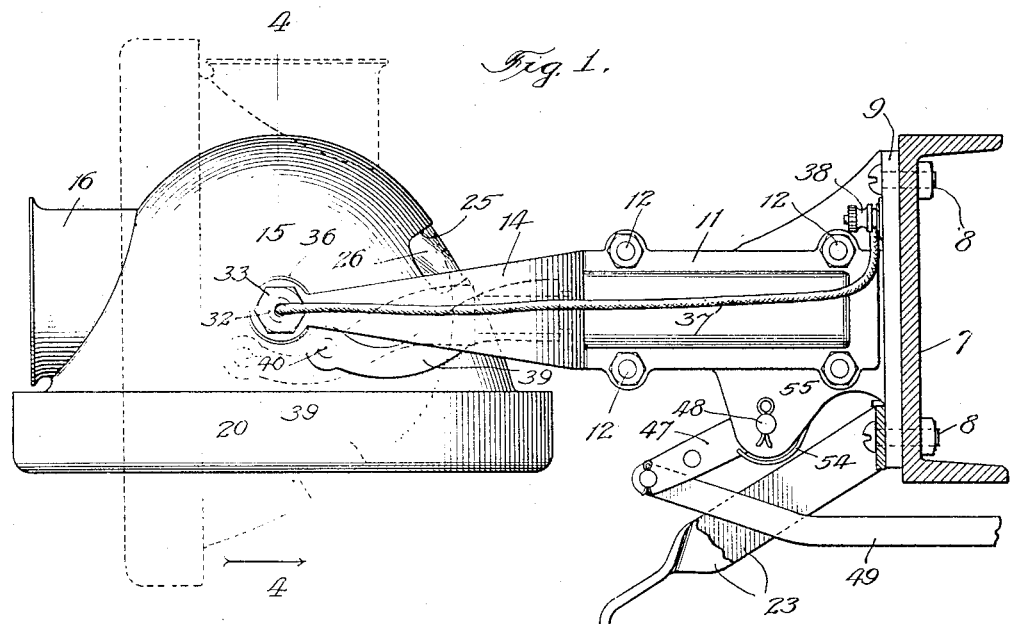
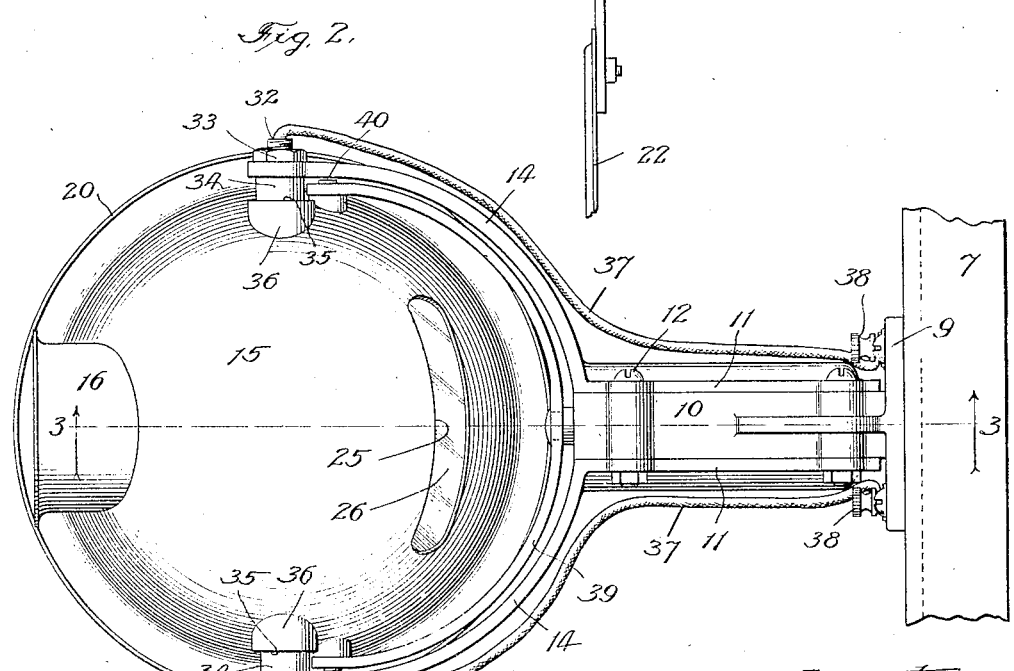

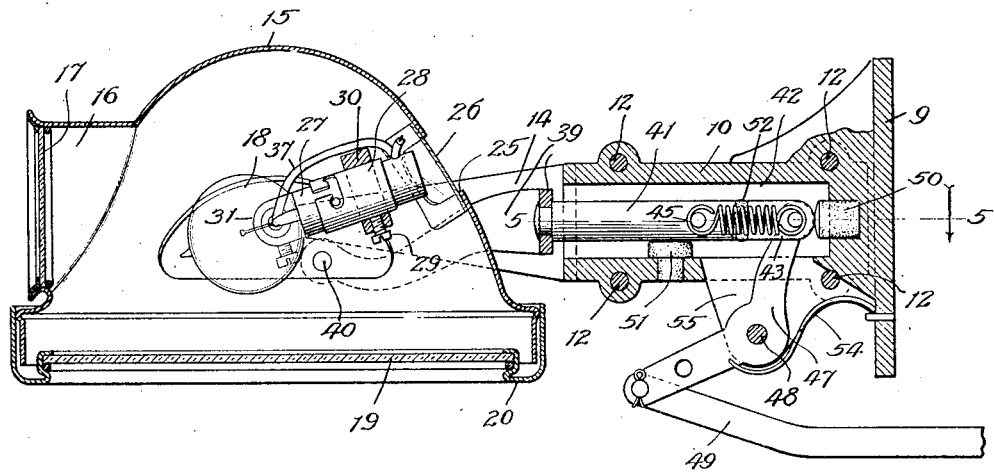
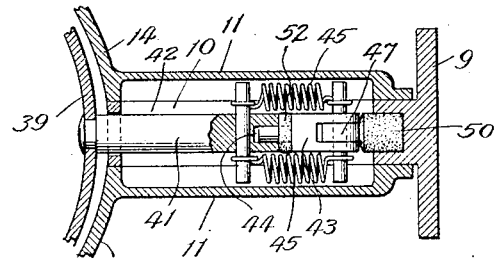
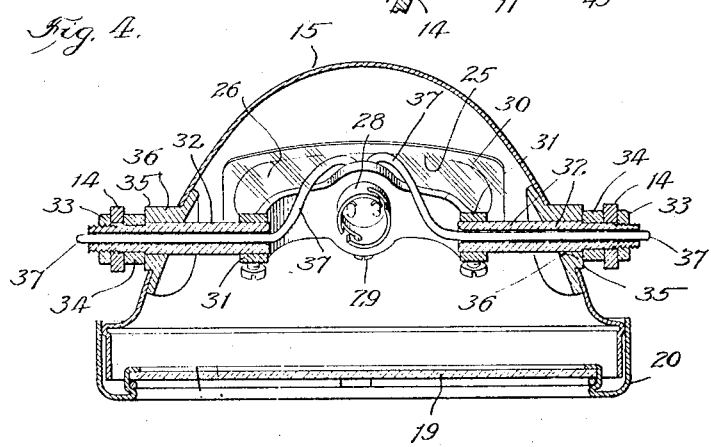

UNITED STATES PATENT OFFICE.

THOMAS STOBS AND WILLIAM LIGHTELL, OF MAYWOOD, ILLINOIS.

SIGNALING-LAMP FOR MOTOR-VEHICLES.

1,350,682.   Specification of Letters Patent.   Patented Aug. 24, 1920.

Application filed March 30, 1917. Serial No. 158,501.

*To all whom it may concern:*

Be it known that we, THOMAS STOBS and WILLIAM LIGHTELL, both citizens of the United States, and residents of Maywood, in the county of Cook and State of Illinois, have invented certain new and useful Improvements in Signaling-Lamps for Motor-Vehicles, of which the following is a full, clear, and exact description.

The invention relates to signaling lamps for motor vehicles.

One object of the invention is to provide an improved device which is adapted to serve both as a tail lamp and a signaling device and in which the entire lamp body is vertically rotatable to expose a warning signal.

A further object of the invention is to provide an improved device of this character which is simple in construction and efficient in operation.

Other objects of the invention will appear from the description.

In the drawings: Figure 1 is a side elevation of a device embodying the invention. Fig. 2 is a plan. Fig. 3 is a vertical longitudinal section taken on line 3—3 of Fig. 2. Fig. 4 is a section taken on line 4—4 of Fig. 1. Fig. 5 is a section taken on line 5—5 of Fig. 3.

The invention is illustrated as embodied in a device comprising a support which is adapted to be secured to the frame 7 of the vehicle by screws 8. This support comprises a bracket 9 adapted to fit against the frame 7 and a hollow outstanding post 10 integrally formed with the wall bracket 9. Sideplates 11 are secured to the sides of the post respectively by bolts 12. Outwardly and rearwardly extending arms 14 integral with the side-plates 11 respectively form a supporting fork in which a lamp-casing or housing is pivotally sustained so it can be swung vertically. That portion of the lamp casing which is above and to the rear of its axis is parabolic to efficiently reflect light from the lamp or lighting unit in the casing. The supporting fork formed by the arms 14 extend rearwardly around and to the central portion of the sides of the casing.

The lamp casing is provided with a cylindrical outstanding portion 16 which extends rearwardly when the lamp casing is in its normal position, as illustrated in full lines in the drawing, and contains a glass pane 17 usually red, to serve the function of a tail lamp, the lens receiving light from an incandescent lamp 18 which is disposed in the casing 15.

That portion of the lamp-casing which is normally at the bottom and is disposed at substantially right angles to the pane 17 is provided with a large glass pane 19 which is suitably fixed in the casing by a ring 20 and is also adapted to receive light from the lamp 18. The signaling-pane 19 is usually marked in some distinctive manner to serve as a visual warning signal when the lamp casing is turned 90° to dispose the pane 19 at the rear of the lamp 18. The signal is rendered efficient by the parabolic reflecting portion of the lamp casing 15 which serves to powerfully reflect light rearwardly through the pane 19 when the latter is turned to its vertical position at the rear of the lamp, and will be clearly visible to vehicles to the rear of the signaling device. When the signaling pane 19 is horizontal or in its normal position, it will serve to illuminate the usual number plate 22 which is mounted on a bracket 23 suitably secured to the bracket 9. To illuminate the number-plate when the signaling pane 19 is operative in the rear of the lamp 18, a light opening 25 is formed in the casing 15 and this opening is protected by a sheet of celluloid 26 to keep the contents of the lamp casing clean.

The incandescent lamp 18 is stationary in the lamp casing and its base 27 is held in a socket 28 of usual construction. This socket is secured by a screw 29 in a saddle 30 which has hubs 31 secured on the inner ends of hollow stems 32, the outer ends of which are secured in the supporting-arms 14. Each stem 32 is fixed in one of the arms 14 by a nut 33, a spacing sleeve 34 being interposed between a shoulder 35 on the sleeve and the arm. The lamp-casing 15 is provided with bearing-members 36 which engage the spacing-sleeves 34 to hold the lamp casing against transverse movement on the stems 32. The electrical conductors 37 leading to the lamp-socket 28 extend through the supporting stems 32 respectively and thence around to the rear of the saddle where they are connected to the socket. The conductors 37 also extend along side of the supporting arms 14 and are connected to binding posts 38 on the bracket 9. This manner of supporting the lamp makes it possible to locate the lamp substantially at the center of a parabolic casing or reflecting surface, while the casing itself is pivotally sustained at its sides by supports through which the conductors are extended.

The device for rocking the lamp-casing vertically, comprises a fork 39 having its extremities pivoted to eccentric points on the lamp-casing, as at 40, and a rod connected to said fork and movably held in the chamber 42 in the supporting post 10. Said rod comprises a section 41 fixed to the fork 39 and a section 43 slidably connected to section 41, as at 44, and yieldingly connected thereto by springs 45 connected to pins on the sections respectively. A rocker 47 pivoted in the supporting-post 10, as at 48, is adapted to be operated by a rod 49 which may be connected to any suitable controlling device such as a special lever adjacent the driver's seat or to one of the brake-levers. The movement of the sectional rod for operating the arm 41 is limited by an elastic bumper 50 at the front of post 10 and a bumper 51 secured in the bottom thereof. These stops are elastic so that sharp or quick operation of the lever 47 by the driver will not rack or jar the lamp or casing through the operating connection. An elastic washer 52 is also interposed between the rod sections 41 and 43. Springs 45 yieldingly permit slight overthrow of the section 41 when the lever 47 is quickly operated to render the signaling pane 19 operative, and the washer 52 cushions the retraction to prevent jarring the lamp-casing and panes. A leaf spring 54 is applied to the rocker 47 and is disposed between lugs 55 in which the rocker is pivoted, to retract lever 47 and the connection for operating the lamp-casing.

The operation of the device will be as follows: Normally, the pane 17 will be illuminated to serve as a tail light by the lamp 18 and light from the same source will pass through pane 19 and illuminate the number plate 22. When it is desired to signal a trailing vehicle, rod 49 will be operated forwardly, which will cause the rocker arm 47 to push the sectional rod 43, 41 rearwardly. This movement of said rod will operate the fork 39 and cause the lamp casing to swing vertically, approximately through an arc of 90°, into position indicated by dotted lines in Fig. 1, the lamp-casing moving around supporting stems 32 while the lighting unit 18 remains stationary. Springs 45, cushion-stop 51, and washer 52 will prevent any sudden jarring of the lamp-casing or the lamp as the result of sharp or quick manipulation of the signal controlling device. When the lamp casing has been thus shifted, the large pane 19 will serve as a signal to the driver of any trailing vehicle to indicate that a change in course or speed is to occur. When the rod 49 is released, spring 54 will retract the operating connection and lamp casing to their normal position. The driver may, by repeatedly operating the lamp-casing, cause a flashing of the signal.

The invention exemplifies a signaling device for automobiles in which the entire lamp casing is rocked or rotated vertically so that either the tail light or the signaling pane can be shifted and so they will be visible from the rear. The device is simple in construction and provision is made for preventing jarring of the parts.

The invention is not to be understood as restricted to the details set forth, since these may be modified within the scope of the appended claims, without departing from the spirit and scope of the invention.

Having thus described the invention, what we claim as new and desire to secure by Letters Patent, is:

1. In a signaling device for automobiles, the combination of a horizontally extending support, comprising a hollow stem having its front end adapted to be secured to an automobile and a rearwardly extending fork, a lamp casing pivotally held in said fork provided with means whereby different indications will be made by rotation of the casing, a lighting unit in the casing and means for vertically tilting the entire casing, comprising a rod longitudinally movable in said hollow stem and having its rear end connected to said lamp casing eccentrically of its pivot and a rocker arm for shifting the rod.

2. In a signaling device for automobiles, the combination of a horizontally extending support, comprising a hollow stem having its front end adapted to be secured to an automobile and a rearwardly extending fork, a lamp casing pivotally held in said fork and a visual signal, a lighting unit in the casing and means for vertically tilting the entire casing, comprising a rod longitudinally movable in said hollow stem, a rocker-arm for shifting the rod and a fork secured to the rear end of said rod and having its rear end eccentrically pivoted to the lamp casing.

3. In a signaling device for automobiles, the combination of a support comprising a hollow stem formed of longitudinally divided sections and having its front end adapted to be secured to an automobile, and a rearwardly extending fork, a lamp casing pivotally held in the fork, and a visual signal, a lighting unit in the casing and means for vertically tilting the casing comprising a rod longitudinally movable in the stem, a rocker-arm for shifting the rod and a fork between the rear end of said rod and the lamp casing.

4. In a signaling device for automobiles, the combination of a support comprising a hollow stem, a lamp casing pivotally held in said support provided with means whereby different indications will be made by rotation of the casing, a lighting unit in the casing, means for tilting the casing comprising a rod longitudinally movable in the stem and formed of sections, a buffer and a yielding connection between the sections and a stop for limiting the movement of the rod to determine one of the positions of the lamp.

THOMAS STOBS.
WILLIAM LIGHTELL.